3,708,596
DISAZO DYESTUFFS
Wilhelm Happe, Schwalbach, Taunus, and Hans Jakob Schladetsch, Frankfurt am Main, Germany, assignors to Farbwerke Hoechst Aktiengesellschaft vormals Meister Lucius & Bruning, Frankfurt am Main, Germany
No Drawing. Filed Dec. 16, 1970, Ser. No. 98,901
Claims priority, application Germany, Dec. 19, 1969,
P 19 63 674.9
Int. Cl. C09b 31/02
U.S. Cl. 260—174                        4 Claims

ABSTRACT OF THE DISCLOSURE

Disazo dyestuffs of the general formula

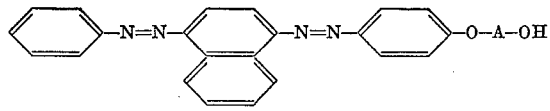

wherein A is an alkylene group, which dyestuffs give orange shades and are used for dyeing and printing textile fibrous materials, especially polyethylene glycol terephthalates.

---

The present invention relates to novel disazo dyestuffs of the general formula

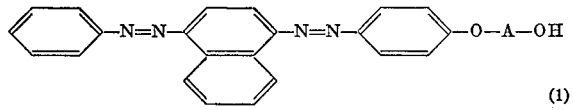

(1)

in which A stands for an alkylene group having 2 to 5 carbon atoms, and which may also be substituted by 1–4 alkyl groups having 1 to 5 carbon atoms, preferably 1 or 2 carbon atoms.

This invention moreover relates to a process for preparing these disazo dyestuffs which comprises reacting the dyestuff of the formula

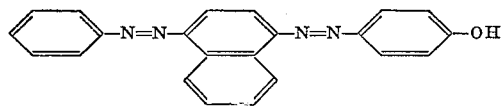

(2)

with 1,2-epoxides of the general formula

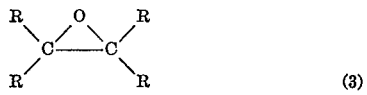

(3)

in which R stands for hydrogen atoms and/or alkyl having 1 to 5 carbon atoms, or with hydroxy-alkyl halides of the general formula

X—A—OH                        (4)

in which A is defined as above and X stands for chlorine, bromine or iodine.

The dyestuff of the above Formula 2 used as starting compound is known to be Disperse Orange 13 (cf. Colour Index (1956), C.I. No. 26 080). Examples of 1,2-epoxides used for this invention are ethylene oxide, propylene oxide, s-dimethyl-ethylene oxide, s-methyl-ethyl-ethylene oxide, trimethyl-ethylene oxide, tetramethyl-ethylene oxide, isobutylene oxide and isopropyl-ethylene oxide. Since they are easy to obtain, ethylene oxide and propylene oxide are preferably used. Examples of hydroxy halides of the above Formula 4 are β-chloroethanol, 3-chloro-propanol-(1), 5-chloro-pentanol-(1) and 6-bromo-hexanol-(2).

The starting compounds of Formula 2 are reacted with the compounds of Formula 3 or 4 under conditions generally applied for the reaction of phenols with 1,2-epoxides or hydroxy-alkyl halides.

The process of the invention is advantageously carried out by reacting the starting dyestuff with the 1,2-epoxide or the hydroxy-alkyl halide at a molar ratio of of from about 1:1 to 1:3, preferably of from about 1:1.1 to 1:2.

As solvents there are especially used glycol ethers, for example diethylene-glycol monoethyl ether and di-ethylene-glycol dimethyl ether, as well as dimethylformamide.

The dyestuffs of Formula 2 are preferably reacted with the 1,2-epoxides in the presence of alkaline catalysts, especially alkali metal carbonates, such as sodium or potassium carbonate, alkali metal hydroxides, such as sodium and potassium hydroxides, as well as strongly basic ion exchangers in the hydroxide form, preferably basic ion exchangers. The reaction with the epoxides may also be carried out in the presence of acid catalysts, for example mineral acids, such as sulfuric acid or phosphoric acid, or sulfonic acids, such as benzene- and p-toluene-sulfonic acid. This reaction is advantageously carried out at a temperature of from about 100 to 200° C.

When hydroxy-alkyl halides are used as reactants according to the invention, the reaction is suitably carried out in the presence of a hydrogen halide-binding agent, especially of alkali metal and alkaline earth metal bicarbonates, carbonates and hydroxides, for example sodium bicarbonate, sodium carbonate and sodium hydroxide. The hydrogen halide split off in the reaction may, however, also be eliminated from the reaction mixture by passing an inert gas, preferably nitrogen, through the mixture during the reaction. According to this embodiment of the invention, the reaction is advantageously carried out at a temperature of from about 50 to 200° C. The hydroxy-alkyl iodides are generally more reactive than the corresponding chlorides and bromides. Unless, therefore, hydroxy-alkyl iodides are available, they may advantageously be prepared in situ from the chlorides or bromides during the reaction by adding alkali metal iodides, especially potassium iodide.

The reaction mixture is worked up and the dyestuff of the invention is obtained in usual manner.

The dyestuffs of the invention are suitable for dyeing and printing hydrophobic synthetic organic textile fibers from an aqueous dispersion, for example for dyeing and printing cellulose-2½-acetate fibers and cellulose tri-acetate fibers, especially for dyeing high-molecular-weight esters made from aromatc polycarboxylic acids and polyfunctional alcohols, for example polyethylene-glycol terephthalate fibers. The dyestuffs may also be used for the dyeing of synthetic polyamide fibers and polyurethane fibers. The abovementioned textile materials are dyed and printed with the dyestuffs of the invention in known manner.

The polyester fibers are dyed with the novel dyestuffs from an aqueous dispersion, preferably at a temperature exceeding 100° C. under pressure, but also at the boiling temperature of water in the presence of carriers, for example phenyl-phenol, polychlorobenzene compounds or similar auxiliaries. Intense dyeings are, moreover, obtained by impregnating woven or knit fabrics made from polyester materials with suspensions of the novel dyestuffs and then subjecting them for a short time to a heat treatment, for example at 180–210° C. Intense orange dyeings very fast to wet processing, sublimation, waste gas and light can be produced on polyester fibers with a very good color build-up. When blended fabrics made from polyester fibers and wool are dyed, the cited dyestuffs dye the wool portion only slightly whereas the polyester portion shows a good color yield. The slight dyeing of the wool portion can easily be removed again by washing it with emulsifiers or treating it with reducing agents.

Compared with the starting dyestuff, the dyestuffs of the invention have the advantage of being more suitable for the dyeing of wound packages, for example cross-wound bobbins, made from texturized polyester fibers or polyester fiber-wool blends from aqueous dispersions. The dyestuffs of the invention also resist vegetable and animal fibers, especially cotton and wool, substantially better than Disperse Orange 13 does. Moreover, the dyeings produced with the dyestuffs of the invention have a better fastness to light and sublimation and their shades are substantially clearer and brighter.

The following examples serve to illustrate the invention, the parts and percentages being by weight unless stated otherwise.

EXAMPLE 1

The reaction was carried out in a multi-necked flask provided with stirrer, internal thermometer, gas inlet pipe and reflux condenser which was filled with a cooling medium of solid carbon dioxide and methylene chloride. In this flask, 35.2 parts of the dyestuff of the formula

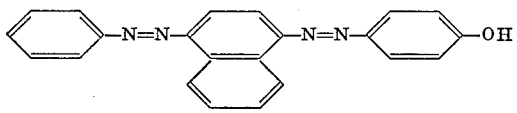

were dissolved in 100 parts by volume of diethyleneglycol monoethyl ether at 160° C. 2 parts of the strongly basic ion exchanger Lewatit® M 600 AA in its hydroxide form were first added to the solution obtained and then 8.8 parts of ethylene oxide were introduced with the aid of a nitrogen stream at the above indicated temperature, the feed of ethylene oxide being controlled in such a manner that a slight reflux was observed at the condenser. After about one hour the reaction was practically complete. The reaction mixture was worked up by filtering off the catalyst from the still hot reaction solution and then precipitating the product from the filtrate by adding water. The reaction product was suction-filtered, washed with water until free from organic solvents and dried. 37.6 parts (95% of the theoretical amount) of a dyestuff were obtained, the analytical data of which corresponded to the formula

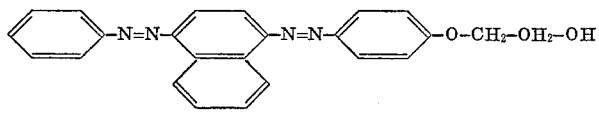

A cross-wound bobbin made from polyethylene-glycol terephthalate fibers and wool (55/45) in a weight of about 500 parts was dyed in a pressure vessel containing an aqueous bath of 6,000 parts by volume for 1 hour at 106° C. at an alternating bath circulation. The bath contained 10 parts of the dyestuffs as prepared above in a dispersed form and 2 parts of a carrier on the basis of o-phenyl-phenol. The pH was 5.5. After the dyeing and rinsing operations, the cross-wound bobbin does not show any dyestuff deposits in contrast to dyeings produced according to the same method with the starting dyestuff Disperse Orange 13.

EXAMPLE 2

The dyestuff was prepared as in Example 1 using, instead of 8.8 parts of ethylene oxide, 11.6 parts of propylene oxide. The Dry Ice cooler was replaced in this case by a water-cooled reflux condenser. After the reaction, 38.5 parts (94% of the theoretical yield) of an almost homogeneous product were obtained, which according to its analytical data had the following formula

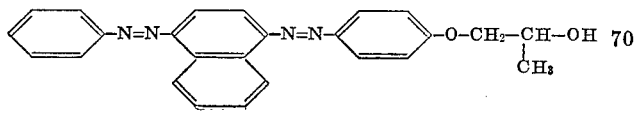

The OH group was positioned at the β-carbon atom in analogy with the observations made by A. R. Sexton and E. C. Britton (cf. J. Am. Chem. Soc. 70, page 3606 (1948)).

The dyestuff dyes polyester material orange shade.

EXAMPLE 3

17.6 parts of the starting dyestuff were reacted in 150 parts by volume of dimethylformamide with 5 parts of 3-chloropropanol-(1) for 2 hours at 100° C. in the presence of 2.8 parts of pulverized potassium hydroxide pellets. To complete the reaction another 2.8 parts of pulverized potassium hydroxide pellets and 5 parts of 3-chloropropanol-(1) were then fed in. After stirring had been continued for 6 hours at 100° C., water was added to the reaction mixture and the mixture was rendered acid by means of 5 N hydrochloric acid. The precipitated dyestuff was suction-filtered, washed with water until free from solvents and until neutral and dried. 19.5 parts (95% of the theoretical yield) of an almost homogeneous product were obtained, the formula of which

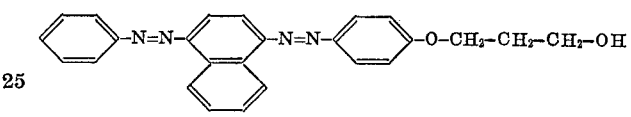

was confirmed by the analytical data.

The dyestuff dyes textile material made from polyethyleneglycol terephthalate fibers orange shades.

We claim:

1. Disazo dyestuffs of the general formula

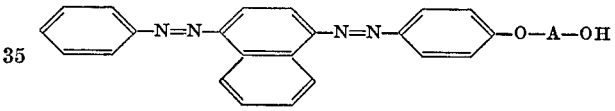

wherein A is an alkylene group of 2 to 5 carbon atoms substituted by 0 to 4 alkyl groups of 1 to 5 carbon atoms.

2. The compound of the formula

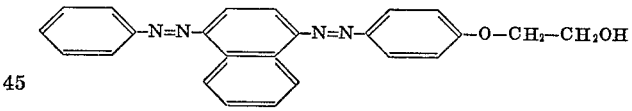

3. The compound of the formula

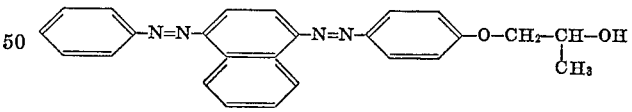

4. The compound of the formula

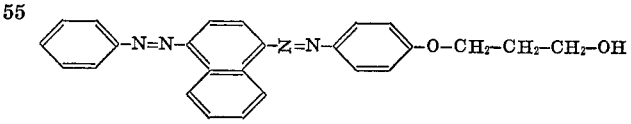

References Cited 617,666 7/1934 Germany _____ 260—191
480,412 12/1969 Switzerland _____ 260—191

LEWIS GOTTS, Primary Examiner

D. M. PAPUGA, Assistant Examiner

U.S. Cl. X.R.

260—185, 191, 208; 8—21 C, 41 C, 173, 174